US006501071B1

(12) United States Patent
Hatase

(10) Patent No.: US 6,501,071 B1
(45) **Date of Patent: *Dec. 31, 2002**

(54) MICROORGANISM MANIPULATING APPARATUS AND MICROORGANISM MANIPULATING METHOD THEREFOR

(75) Inventor: Takayuki Hatase, Fukuoka (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/504,849

(22) Filed: Feb. 16, 2000

(30) Foreign Application Priority Data

Feb. 19, 1999 (JP) .......................................... 11-041335

(51) Int. Cl.[7] .......................... H05H 3/04; G01B 13/00
(52) U.S. Cl. ..................................................... 250/251
(58) Field of Search ................................ 250/251, 301, 250/304, 306, 307, 442.11, 363.02, 364, 428

(56) References Cited

U.S. PATENT DOCUMENTS 5,212,382 A * 5/1993 Sasaki et al. ............... 250/251
5,495,105 A * 2/1996 Nishimura et al. ......... 250/251
5,736,410 A * 4/1998 Zarling et al. ........... 250/458.1
5,776,674 A * 7/1998 Ulmer ........................ 356/364
5,952,651 A * 9/1999 Morito et al. ............... 250/251
6,159,686 A * 12/2000 Kardos et al. ........... 250/484.2
6,159,749 A * 12/2000 Liu ............................ 250/251
6,180,415 B1 * 1/2001 Schultz et al. .............. 356/301

* cited by examiner

*Primary Examiner*—John R. Lee
*Assistant Examiner*—Anthony Quash
(74) *Attorney, Agent, or Firm*—Stevens, Davis, Miller & Mosher, LLP

(57) ABSTRACT

A microorganism manipulating apparatus that has a low cost and that uses optical trapping to concurrently acquire a plurality of microorganisms, comprises: an optical trapping device, including a single laser beam output unit for emitting a laser beam, an optical system for condensing the laser beam, and a single galvanoscanner for making the laser beam scan and emitting the laser beam to a microorganism to be manipulated to acquire the microorganism; and a multi-trap controller, for controlling a laser output control unit and a galvanoscanner driver so that the optical trap device can concurrently acquire a plurality of microorganisms in a time-sharing manner. With this arrangement, the cost required for equipment of an expensive laser projection system and an expensive scanning/optical system, can be reduced, and inexpensive equipment can be used to perform an efficient microorganism operation.

8 Claims, 10 Drawing Sheets

| OBJECT | PRESENT POSITION | | TARGET POSITION | |
|---|---|---|---|---|
| 28a OBJECT 1 | SX1 = zzz. z | SY1 = zzz. z | EX1 = zzz. z | EY1 = zzz. z |
| OBJECT 2 | SX2 = | SY2 = | EX2 = | EY2 = |
| OBJECT 3 | SX3 = | SY3 = | EX3 = | EY3 = |

| OBJECT | PRESENT POSITION | | TARGET POSITION | |
|---|---|---|---|---|
| 28a OBJECT 1 | SX1 = zzz. z | SY1 = zzz. z | EX1 = zzz. z | EY1 = zzz. z |
| 28b OBJECT 2 | SX2 = zzz. z | SY2 = zzz. z | EX2 = zzz. z | EY2 = zzz. z |
| 28c OBJECT 3 | SX3 = zzz. z | SY3 = zzz. z | EX3 = zzz. z | EY3 = zzz. z |

| OBJECT | PRESENT POSITION | | TARGET POSITION | |
|---|---|---|---|---|
| OBJECT 1 | SX1 = zzz. z | SY1 = zzz. z | EX1 = zzz. z | EY1 = zzz. z |
| OBJECT 2 | SX2 = zzz. z | SY2 = zzz. z | EX2 = zzz. z | EY2 = zzz. z |
| OBJECT 3 | SX3 = zzz. z | SY3 = zzz. z | EX3 = zzz. z | EY3 = zzz. z |

| OBJECT | PRESENT POSITION | | TARGET POSITION | |
|---|---|---|---|---|
| OBJECT 1 | SX1 = zzz. z | SY1 = zzz. z | EX1 = zzz. z | EY1 = zzz. z |
| OBJECT 2 | SX2 = zzz. z | SY2 = zzz. z | EX2 = zzz. z | EY2 = zzz. z |
| OBJECT 3 | SX3 = zzz. z | SY3 = zzz. z | EX3 = zzz. z | EY3 = zzz. z |

$$t\,[ON] = \frac{TC - count\,[OBJECT] \times t\,[OFF]}{count\,[OBJECT]}$$

MICROORGANISM MANIPULATING APPARATUS AND MICROORGANISM MANIPULATING METHOD THEREFOR

FIELD OF THE INVENTION

The present invention relates to a microorganism manipulating apparatus and to a microorganism manipulating method for acquiring and/or moving microorganisms, such as germs or animal/plant cells.

RELATED ARTS

In various tests and analyses employed in the biochemistry field, there is performed an operation that a specific microorganism is identified, acquired and separated among microorganisms, such as germs or animal/plant cells, which are present in a sample. Recently, laser tweezers have been employed to acquire individual microorganisms. To do this, the laser tweezers emit and condense a laser beam directed toward a microorganism in a sample solution, and form an optical trap by which the microorganism is acquired. In the laser tweezers, there are such many merits that a microorganism can be acquired without contact and without damage, and that a microorganism which has been acquired by performing a scanning operation using the laser beam can be moved to an arbitrary location in a sample.

An object to be acquired or to be picked from others is not always simply an individual microorganism, and a plurality of microorganisms may be handled simultaneously. In such a case, if the above described laser tweezers are employed, a plural sets of the laser tweezers apparatuses are required to acquire the microorganisms. However, since the laser tweezers apparatus is constituted by delicate and expensive optical devices, such as a laser radiation device and a laser beam scanning device, if such optical devices were provided in proportion to the number of objects to be operated, the cost would be very high. Therefore, conventionally, manipulating apparatuses or the like have been put to practical use, in which only a plurality of laser beam scanning devices and optical systems are provided and a laser radiation device is used in common by splitting a laser beam so as to reduce cost. However, even then the cost is high, and further cost reduction is presently required.

SUMMARY OF THE INVENTION

It is, therefore, one objective of the present invention to provide at a low cost a microorganism manipulating apparatus in which a plurality of microorganisms can be simultaneously acquired with an optical trap, and a microorganism manipulating method therefor.

To achieve the above objective, a microorganism manipulating apparatus according to the present invention comprises:

optical trapping means, in which single laser beam radiation means emits a laser beam, an optical system concentrates the laser beam, and single laser beam scanning means uses the concentrated laser beam to scan a microorganism so as to emit the laser bean to the microorganism and to acquire the microorganism; and multi-trap control means for controlling the optical trapping means to simultaneously acquire a plurality of microorganisms in a time-sharing manner.

According to the present invention, a microorganism manipulating apparatus may include laser output control means for controlling the output of the laser beam radiation means, and the laser output control means may be controlled by the multi-trap control means to change the output of a laser at the time of acquisition and of non-acquisition of the microorganism to be manipulated.

According to the present invention, provided is a microorganism manipulating method in which multi-trap control means controls optical trap means, in which single laser beam radiation means emits a laser beam, an optical system concentrates the laser beam, and single laser beam scanning means uses the concentrated laser beam to scan a microorganism to be manipulated so as to emit the laser beam to the microorganism and to acquire the microorganism, and thus, a plurality of microorganisms are simultaneously acquired in a time-sharing manner.

According to the microorganism operation method of the present invention, the output of a laser for the laser beam radiation means may be changed at the time of acquisition and at the time of non-acquisition of the microorganism to be manipulated.

According to the present invention, since single optical trap means is employed to simultaneously acquire a plurality of microorganisms in a time-sharing manner, inexpensive equipment can be used to perform an efficient microorganism operation.

DETAILED DESCRIPTION OF THE PREFERRED EMBODIMENT

Figure 1:
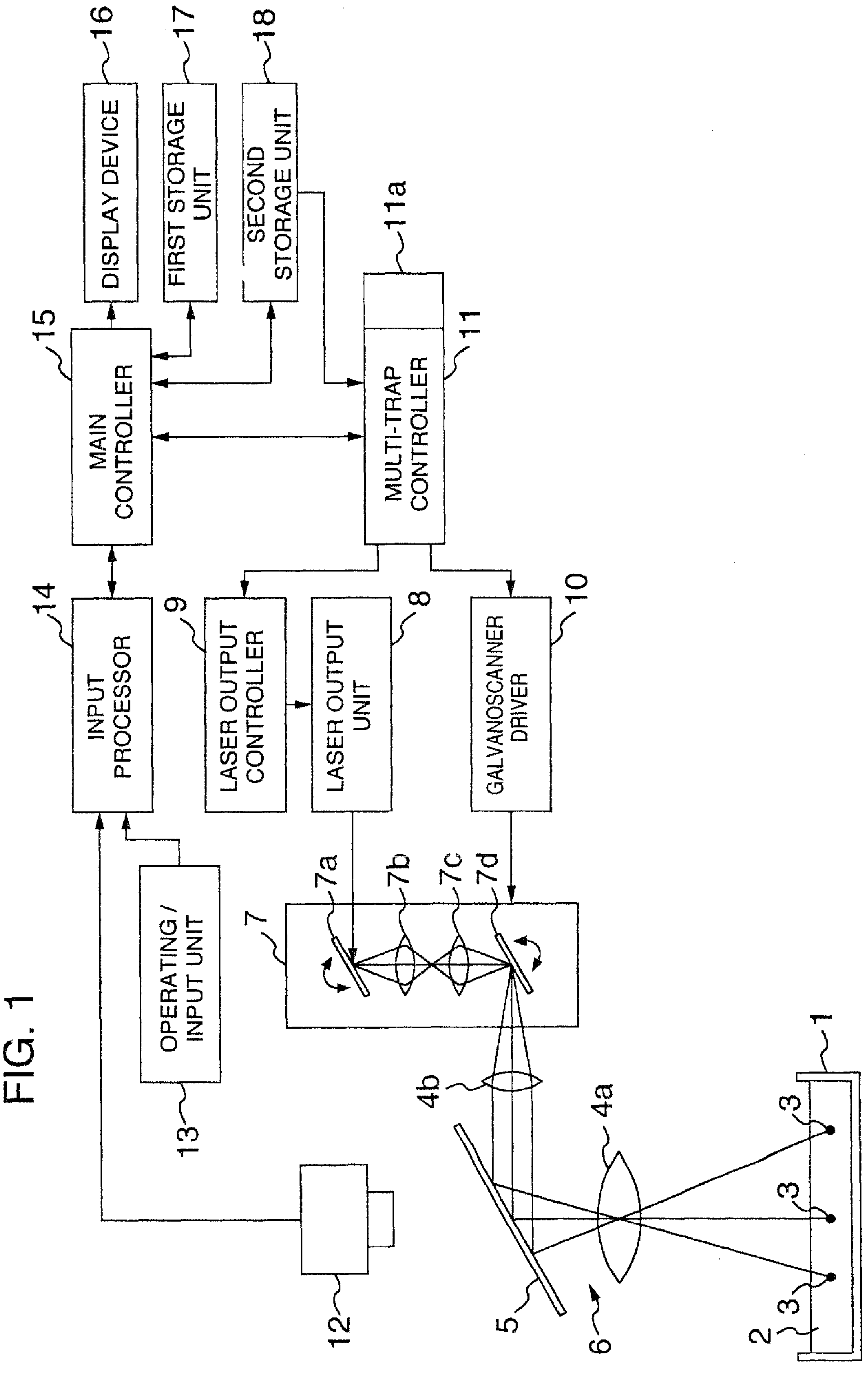
FIG. 1 is a block diagram illustrating an arrangement of a microorganism manipulating apparatus according to one embodiment of the present invention.

A preferred embodiment according to the present invention will now be described while referring to the drawings.

First, an arrangement of a microorganism manipulating apparatus according to the invention will be described while referring to FIG. 1. In FIG. 1, multiple microorganisms 3, such as germs and animal/plant cells, are floating in a solution 2 that is contained in a sample container 1. These microorganisms 3 are objects to be acquired or moved by an manipulating apparatus. Located above the sample container 1 is an optical system 6 that includes a half-mirror 5 and lenses 4*a* and 4*b*.

A laser beam emitted by a laser output unit 8, which is used as a laser beam radiation means, passes through a galvanoscanner 7 to the lens 4*b*. When the laser output unit 8 is driven by a laser output controller 9, which is used as laser output control means, a laser beam is emitted and enters the galvanoscanner 7. The laser beam then passes through the lens 4*b,* is reflected by the half-mirror 5, and passes through the lens 4*a* to the sample container 1.

The galvanoscanner 7 includes galvanomirrors 7*a* and 7*d* and lenses 7*b* and 7*c*. The galvanomirrors 7*a* and 7*d* are driven by a galvanoscanner driver 10, so that a position whereat the laser beam is projected in the sample container 1 can be optically changed. Therefore, the galvanoscanner 7 and the galvanoscanner driver 10 serve as laser beam scanning means for making a laser beam scan. The optical system 6 condenses the incident laser beam and projects the beam into the sample container 1.

A camera 12 is located above the half-mirror 5. The camera 12 takes a picture of the microorganism 3 in the sample container 1 through the half-mirror 5. An input processor 14 performs A/D conversion of an image data obtained by taking the picture, and the resultant data is entered to a main controller 15. An operating/input unit 13, such as a keyboard or a mouse, is connected to the input processor 14, and operating commands and various data are entered in the operating/input unit 13.

The main controller 15 has an image processing function, and processes the image data based on various programs that are stored in a first storage unit 17 and are required for the image recognition process, so as to detect positions of the microorganisms 3 in the sample container 1. A display unit 16 displays the obtained images of the microorganisms 3 and a screen for entry of operating commands.

The laser output controller 9 and the galvanoscanner driver 10 are controlled by a multi-trap controller 11. Position data for the microorganisms 3 detected by the main controller 15 are transmitted to the multi-trap controller 11. Based on the position data, the multi-trap controller 11 controls the galvanoscanner driver 10, so that a laser beam condensed by the optical system 6 can be projected onto an arbitrary microorganism 3 in the sample container 1. As a result, a microorganism 3 radiated by the laser beam can be optically acquired by the laser beam. The laser output unit 8, the laser output controller 9, the galvanoscanner 7, the galvanoscanner driver 10 and the optical system 6 serve as optical trap means for acquiring a microorganism with a laser beam.

The microorganism manipulating apparatus in this embodiment comprises only a single set consisting of the laser output unit 8, the laser output controller 9, the galvanoscanner 7, and the optical system 6, i.e., comprises a single optical trap means. An explanation will now be given for a multi-trap function, with such a single optical trap means, to simultaneously acquire and/or move a plurality of microorganisms.

The multi-trap controller 11 has one function independently performing a multi-trapping process separately from the main controller 15, and includes a timer 11*a* for defining a radiation time during which a laser beam is projected onto a microorganism to be manipulated. A second storage unit 18 is used to store multi-trap data, such as a count value for the microorganisms to be manipulated and coordinate data concerning a present position and a destination position, described later, which are required for the multi-trapping process.

Based on the multi-trap data, the multi-trap controller 11 controls the laser output controller 9 and the galvanoscanner driver 10, in the timing provided by the timer 11*a,* so that a plurality of microorganisms 3 can be timely and sequentially radiated by a laser beam and can be simultaneously acquired. That is, the multi-trap controller 11 controls the optical trap means to simultaneously acquire a plurality of microorganisms 3 in a time-sharing manner.

Figure 2:
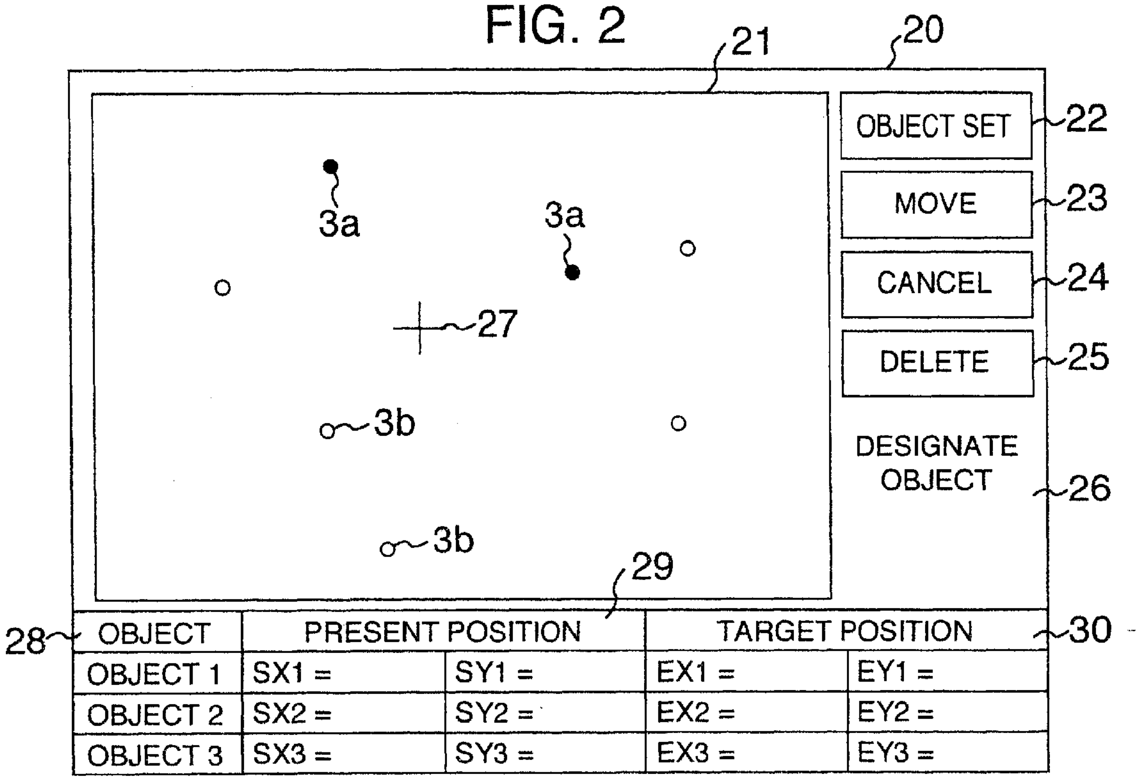
FIG. 2 is a view showing a display screen of the microorganism manipulating apparatus according to the embodiment in FIG. 1.

Instructions and input required for the multi-trapping process are entered on the screen displayed by the display unit 16. The display screen will now be described while referring to FIG. 2. A display screen 20 includes an image frame 21 in which an image picture taken in the sample container 1 is displayed; operating buttons 22 to 25; a message box 26; an object column 28; a present position coordinate display column 29; and a target position coordinate display column 30. Microorganisms 3*a* and 3*b* and a cursor 27 are displayed inside the image frame 21.

When the operating button 22 is selected, a setting for an object can be made, i.e., a microorganism to be manipulated can be specified on the display screen. When the operating button 23 is selected, movement of the microorganism designated in the object setting process is initiated. When the operating button 24 or 25 is selected, the setting of an object that was previously performed is canceled, the multi-trapping process is reset, or the entire setting process is canceled. A message requesting an input operation, such as the designation of an object, is displayed in the message box 26. An object number is displayed in the object column 28 to specify a designated object on the screen. The XY coordinate values of the present position and the target position of each designated microorganism is displayed in the present position coordinate display column 29 and the target position coordinate display column 30.

Figure 8:
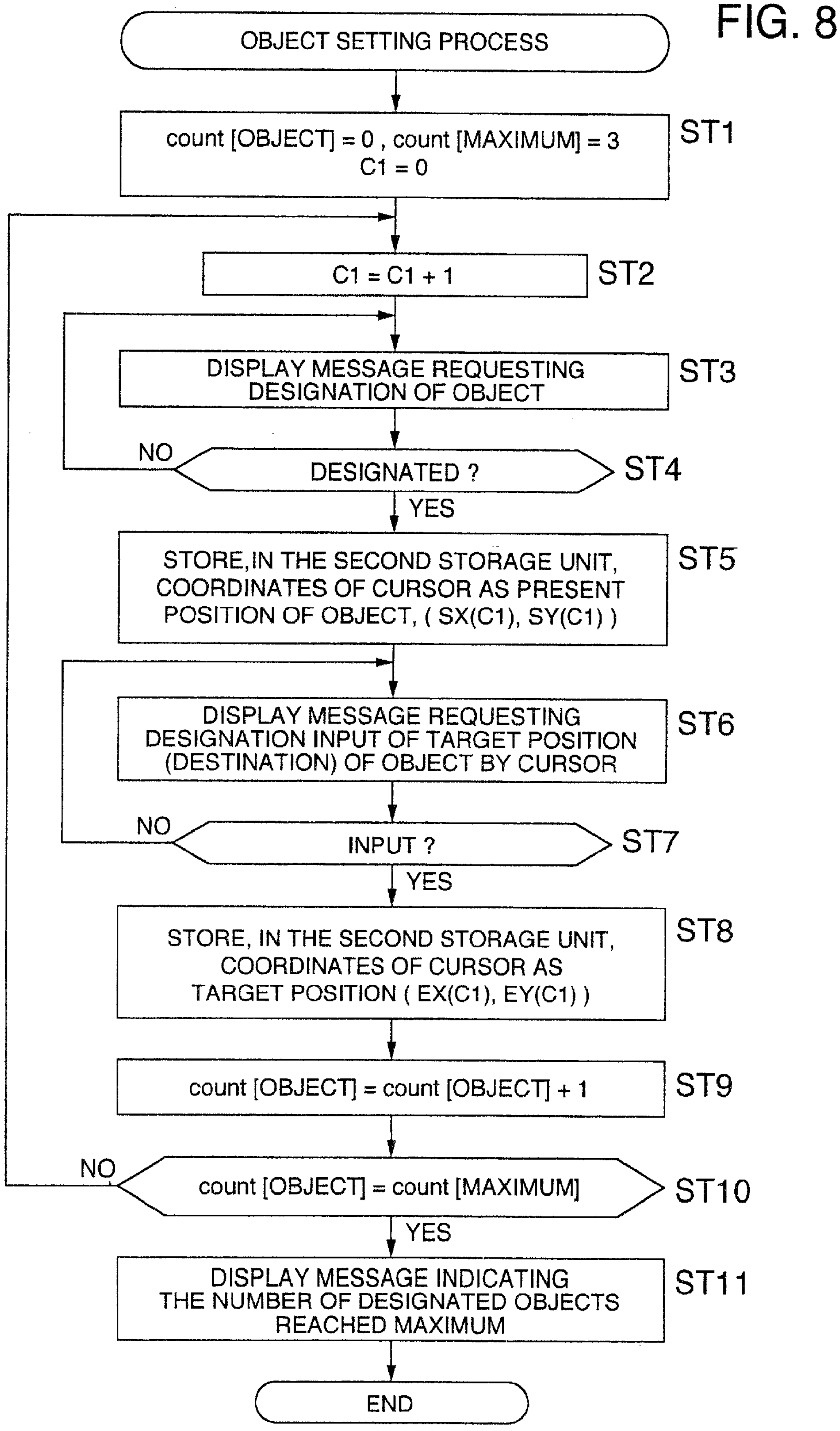
FIG. 8 is a flowchart showing a microorganism manipulating method according to the embodiment.

An explanation will now be given, while referring to the accompanying drawings, for a microorganism manipulating method performed by the thus arranged microorganism manipulating apparatus. First, the object setting process will be explained while referring to FIGS. 2 to 5 and to the flowchart in FIG. 8. In this object setting process, a microorganism to be manipulated is specified on the display screen, and a present location and a location of a destination of the pertinent microorganism are designated. In FIG. 8, first, a counter is initialized (ST1). In this process, a count [object] denotes the number of designated microorganisms that have already been set, a count [maximum] denotes the maximum number (three in this embodiment) of microorganisms that has been set in advance. C1 denotes a counter that indicates a processing order, and when the process is initiated, the counter C1 is incremented by one (ST2).

Figure 3:
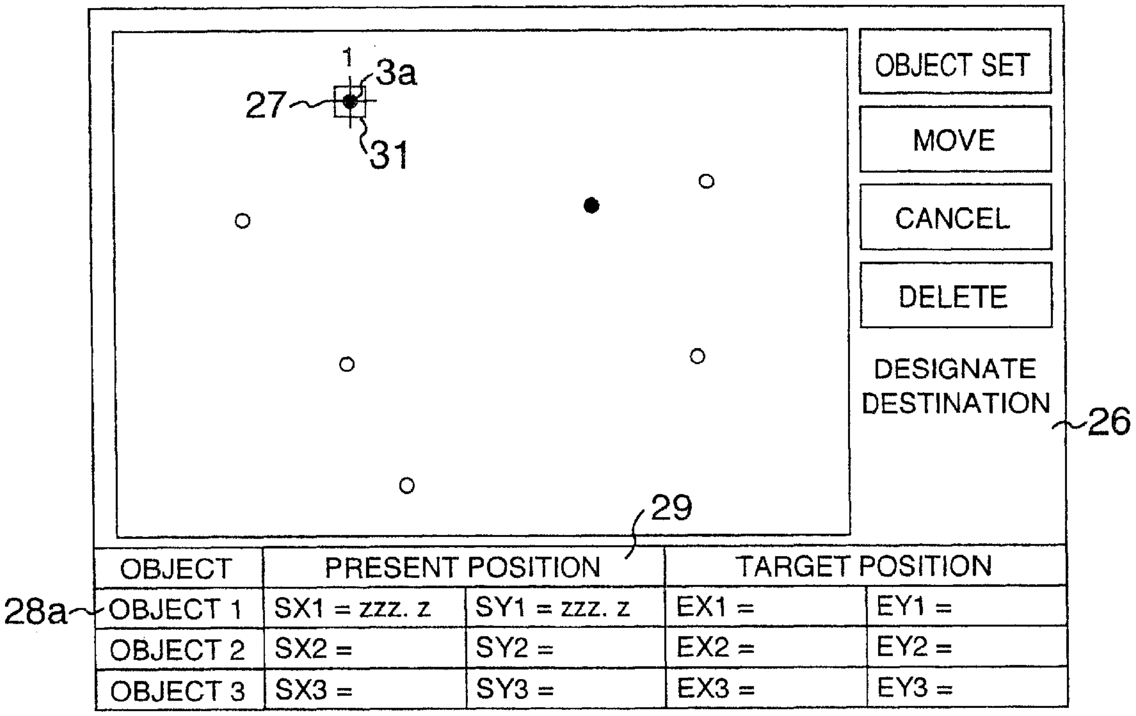
FIG. 3 is a view showing the display screen of the microorganism manipulating apparatus according to the embodiment.
Figure 4:
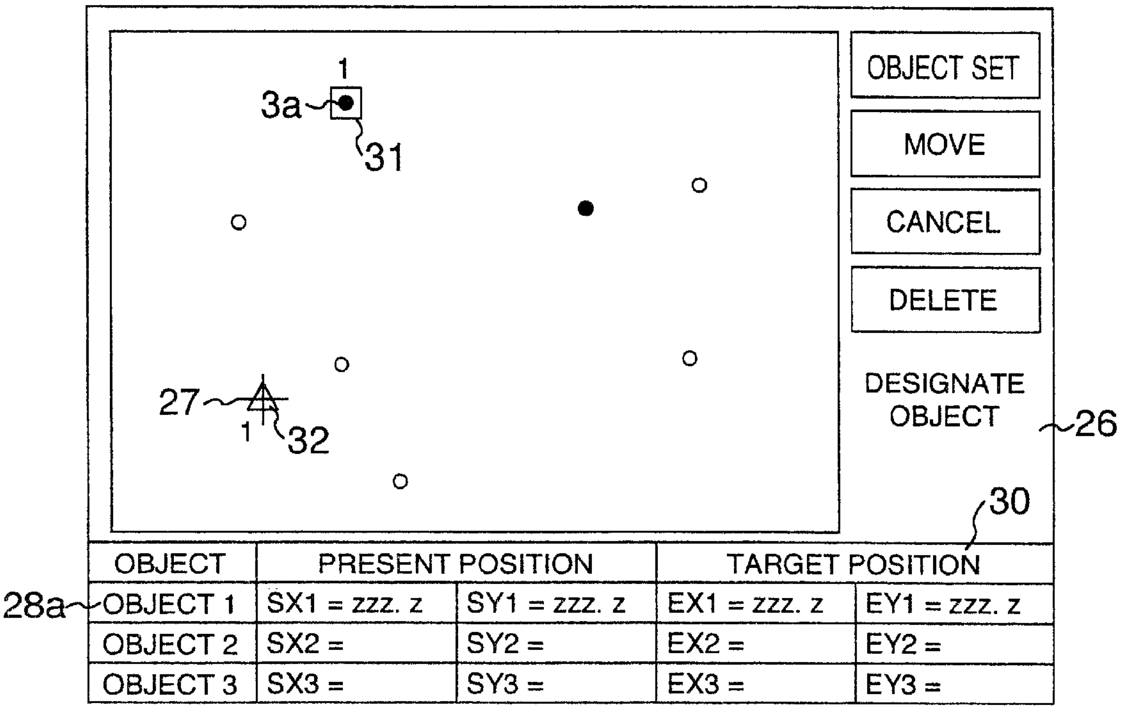
FIG. 4 is a view showing the display screen of the microorganism manipulating apparatus according to the embodiment.

Next, a message requesting that an object be designated is displayed on the screen (ST3). Then, in response to the message on the display, an operator moves the cursor 27 to a desired microorganism 3. When it has been confirmed that and object has been designated (ST4), a square frame 31 is displayed at the pertinent location to indicate that the specific microorganism has been designated, and the coordinates of the cursor 27 are stored in the second storage unit 18 (ST 5 ) as a present position (SX(C1), SY(C1)) of the microorganism. In FIG. 3, since the cursor 27 has been moved to a microorganism 3*a,* object 1 in a display column 28*a* is specified, and the coordinate values for the present location of object 1 are displayed in the present position coordinate display column 29. Then, a message is displayed in the message box 26 requesting to designate a target location (a destination) for the microorganism 3 with cursor 27 (ST6). In response to this message, the operator moves the cursor 27 to designate and enter the target location.

When it is confirmed that the target location has been designated (ST7), a triangular frame 32 is displayed at the designated location and the coordinates of the cursor 27 are stored in the second storage unit 18 as target position coordinates (EX(C1), EY(C1)) (ST8). The object setting process for a single microorganism is thereafter terminated, and the count [object] is incremented by one (ST9).

Figure 5:
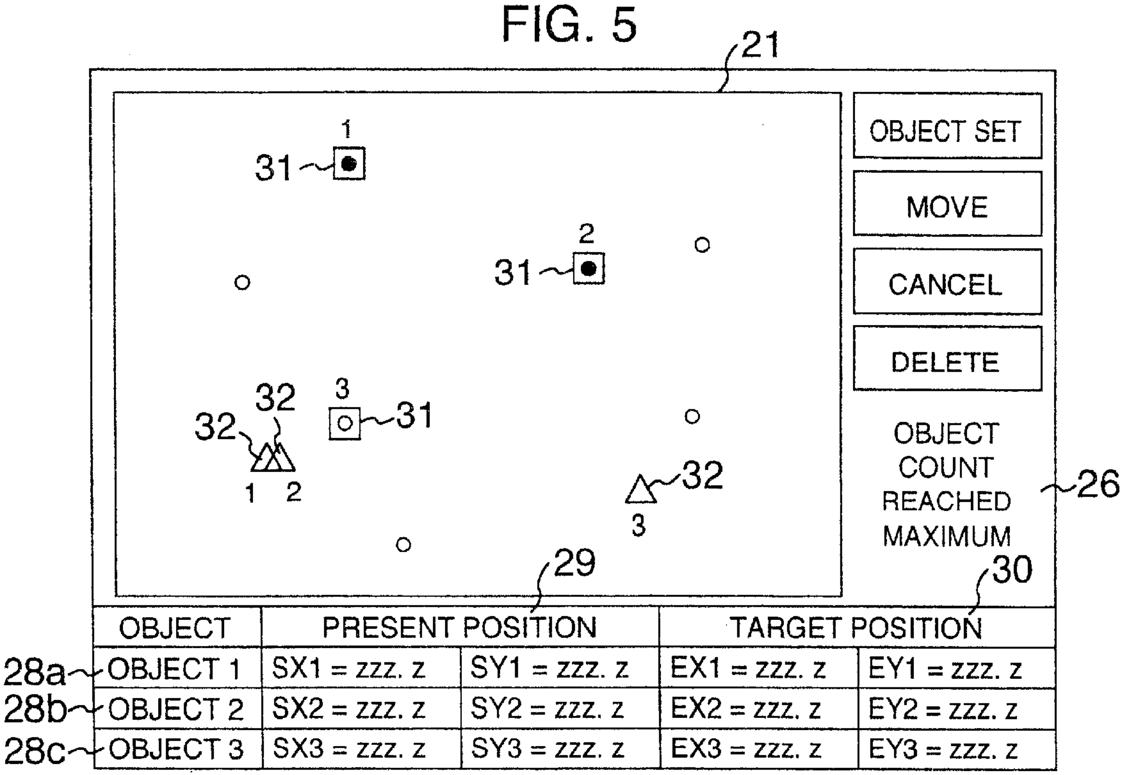
FIG. 5 is a view showing the display screen of the microorganism manipulating apparatus according to the embodiment.

A check is then performed to determine whether the count [object], i.e., the number of objects that have been designated, has reached the count [maximum] (ST10). If the number of objects has not reached the count [maximum], program control returns to ST2 and the above described process is repeated. When the number of objects has reached the count [maximum] (three), as shown in FIG. 5, a message is displayed indicating that the number of designated objects equals the maximum value (ST11). The object setting process is thereafter terminated.

Through this process, in the image frame 21 three microorganisms (object 1, object 2 and object 3 ), and the target locations that have been instructed, are displayed using the square frames 31 and the triangular frames 32. And the coordinate values of the present locations and the target locations for object 1, object 2 and object 3 are displayed in the rows 28*a,* 28*b* and 28*c.* In this embodiment, the maximum number (three) of microorganisms has been designated; however, the number of designated microorganisms may be smaller, i.e., one or two.

Figure 9:
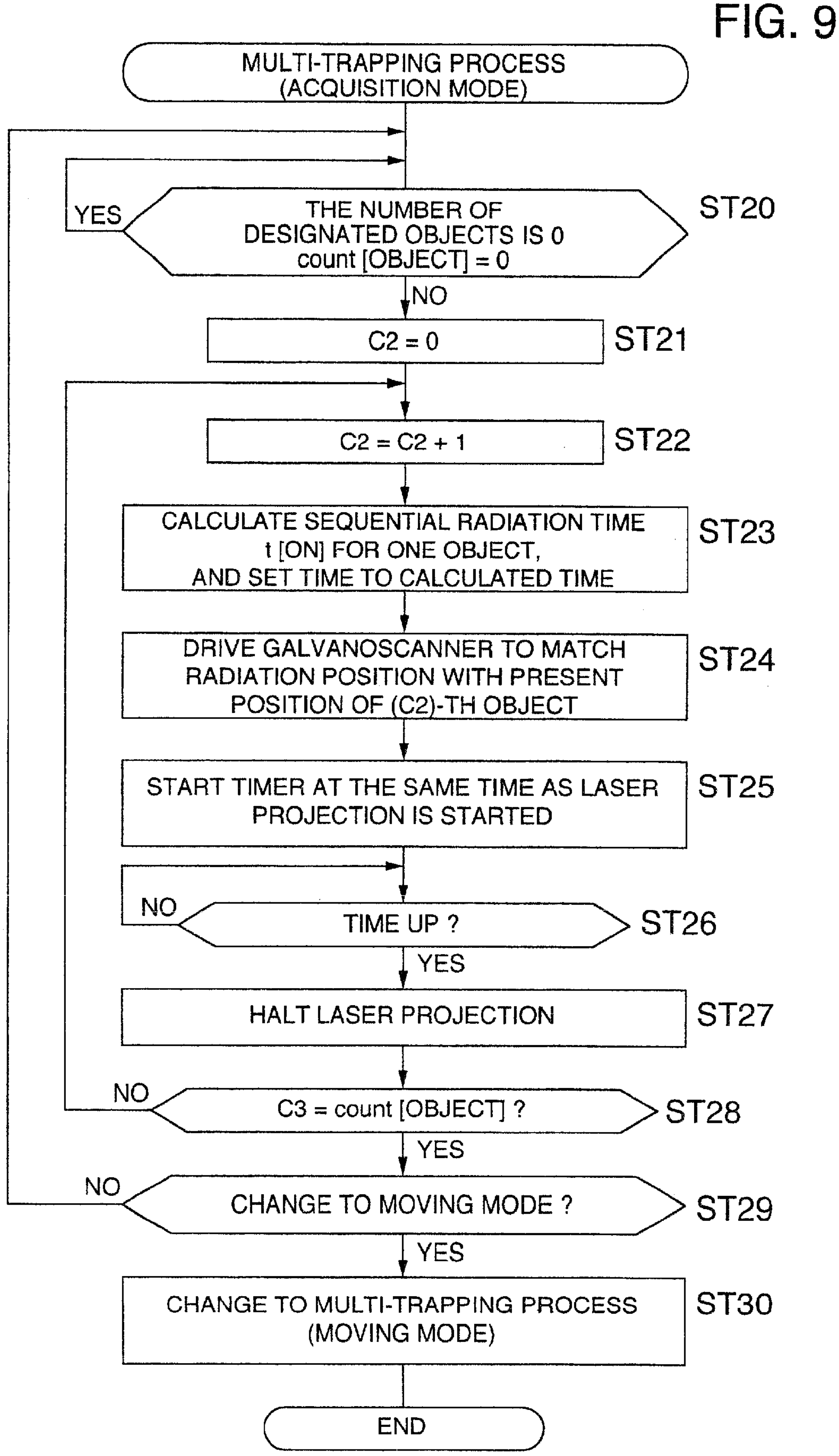
FIG. 9 is a flowchart showing the microorganism manipulating method according to the embodiment.

The acquisition mode in the multi-trapping process will now be described while referring to the flowchart in FIG. 9. According to this process, a plurality of microorganisms 3 designated in the object setting process are simultaneously acquired and their present locations are maintained. The acquisition process is initiated after the microorganisms to be manipulated have been designated. First, a check is performed to determine whether the count [object] is 0, i.e., whether a microorganism to be manipulated has been designated (ST 20 ). When the count [object] is other than 0, the counter C2 indicating the process order is reset to 0, (ST21), and thereafter the value of the counter C2 is incremented by one (ST22). Then, the sequential radiation time t [ON] for one microorganism is calculated, and a timer 11*a* of the multi-trap controller 11 is set to the calculated time (ST23).

Figure 13:
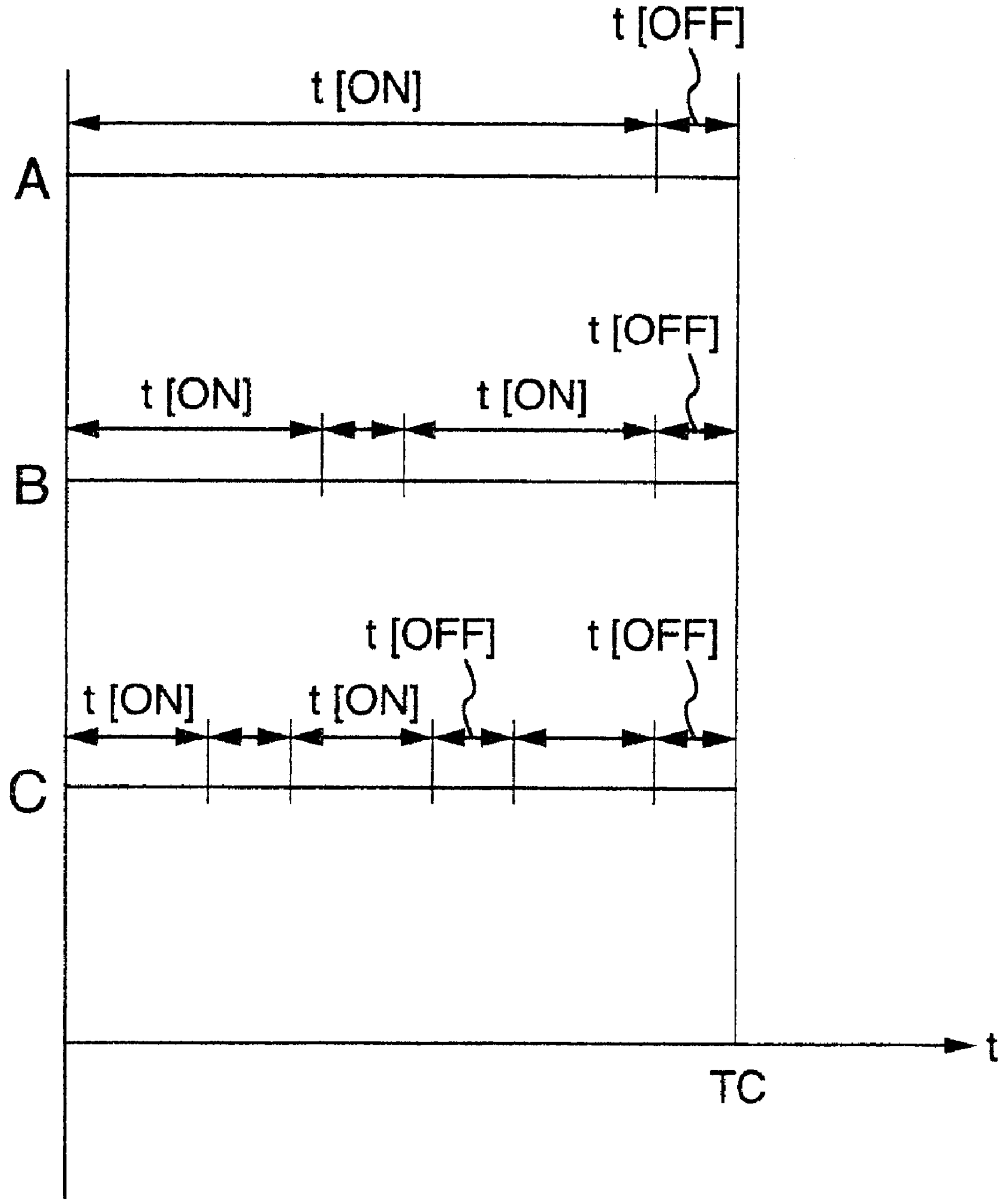
FIG. 13 is a time chart of an acquisition operation for a microorganism according to the embodiment.

The sequential radiation time t [ON] will now be explained while referring to FIG. 13. In FIG. 13 are shown the proportions of the sequential radiation time t [ON] and the radiation stop time t [OFF] in the cycle time Tc for the acquisition operation with the laser beam. A, B and C in FIG. 13 show the time charts when the count [object] is 1, 2 and 3, and in the time charts one sequential radiation time [ON] is always paired with one radiation stop time [OFF]. That is, the expression shown in FIG. 13 is employed to calculate the sequential radiation time t[ON] by using the radiation stop time t [OFF], which has a fixed value, and the value of the count [object].

The galvanoscanner 7 is then driven to match the projection location for the laser beam with the present position of the (C2)-th microorganism (ST 24), which is read from the second storage unit 18. At the same time as the laser projection is started, the timer 11*a* is initiated (ST 25). When it is confirmed that the time set for the timer 11*a* has expired (ST26), the laser projection is halted (ST27). A check is then performed to determine whether the count value of the counter C2 equals the count [object], which is the number of microorganisms that are currently designated (ST28). If the count value does not equal the count [object], program control returns to ST22 and the above described process is repeated.

When the value of the counter C2 equals the count [object], a check is performed to determine whether the acquisition mode has been changed to the moving mode, i.e., whether the operating button 23 has been operated and moving is selected (ST 29). If moving is not selected, program control returns to ST 20 to continue the acquisition condition. If moving is selected, the acquisition mode is changed to a moving mode in the multi-trapping process, which will be described later (ST30).

In the above explanation, there is no change in the strength of a laser beam output emitted by the laser output unit 8, and a switch between the processing for the acquisition and the processing for the non-acquisition of a microorganism is effected by the intermittent laser beam radiation. Also, the laser output controller 9 may be so controlled by the multi-trap controller 11 that the strength of the laser beam output is changed in accordance with whether a microorganism is acquired or not acquired. That is, the projection of a laser beam emitted by the laser output controller 8 is not halted even during a microorganism non-acquisition period, and the laser output is altered to a lower level where almost no optical trapping action occurs, so as to set the device to the non-acquisition state. When this control method is employed, the laser output unit 8 is always in the driven state, so that the rising time required for laser beam projection in starting acquisition can be reduced and the response property of the manipulating apparatus can be improved.

The moving mode in the multi-trapping process will now be described while referring to FIG. 10. In accordance with this process, a microorganism that has been acquired is moved to a target location by a scanning operation with the laser beam. In this embodiment, three microorganisms described above are moved to the designated target locations. The moving process is begun upon the selection of the operating button 23 in FIG. 6.

Figure 10:
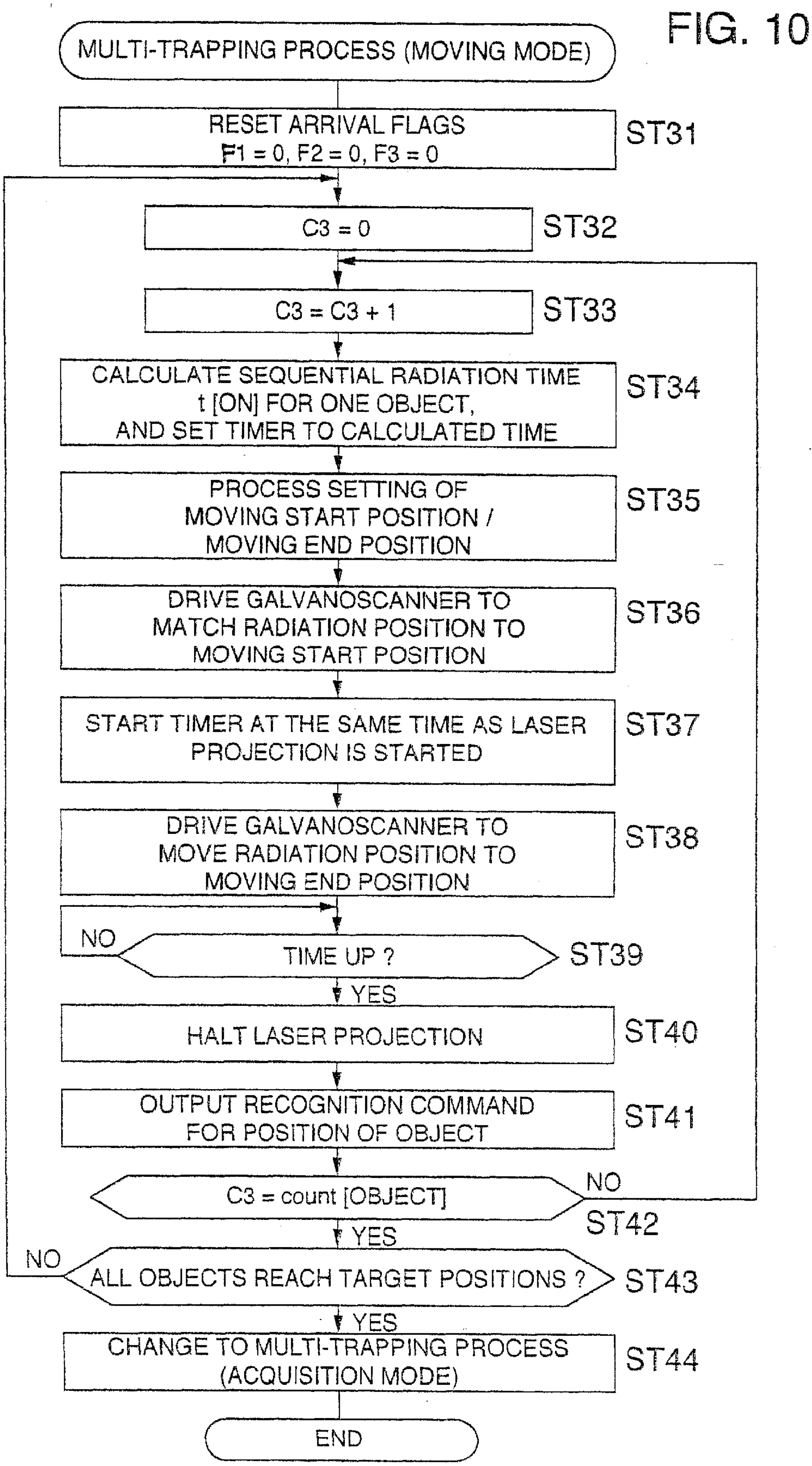
FIG. 10 is a flowchart showing a microorganism manipulating method according to the embodiment.

First, in FIG. 10, arrival flags F1, F2 and F3, which indicate whether the individual microorganisms have arrived at their the target locations, are set to 0, i.e., to the non-arrival state (ST31). Then, the counter C3 is reset (ST32), following which its value is incremented by one (ST33). The sequential radiation time t[ON] for one object is calculated and the timer 11*a* is set to the calculated time (ST34). As same as in the acquisition mode, the sequential radiation time t[ON] is determined based on the radiation stop time t[OFF] and the value of the counter C2 that indicates the number of designated microorganisms.

The process for setting the moving start position/moving end position is performed for the (C3)-th microorganism (ST35). In this process, the moving start position and the moving end position is set whenever the microorganism is moved during one cycle where each microorganism is acquired and moved by a scanning operation with a laser beam. This process is performed in accordance with a sub-routine that will be described later. When the moving start position is designated, the galvanoscanner 7 is driven to match the radiation position with the moving start position (ST36), and when the present acquisition position matches the moving start position at the beginning of the process, the radiation position is not actually moved.

Figure 6:
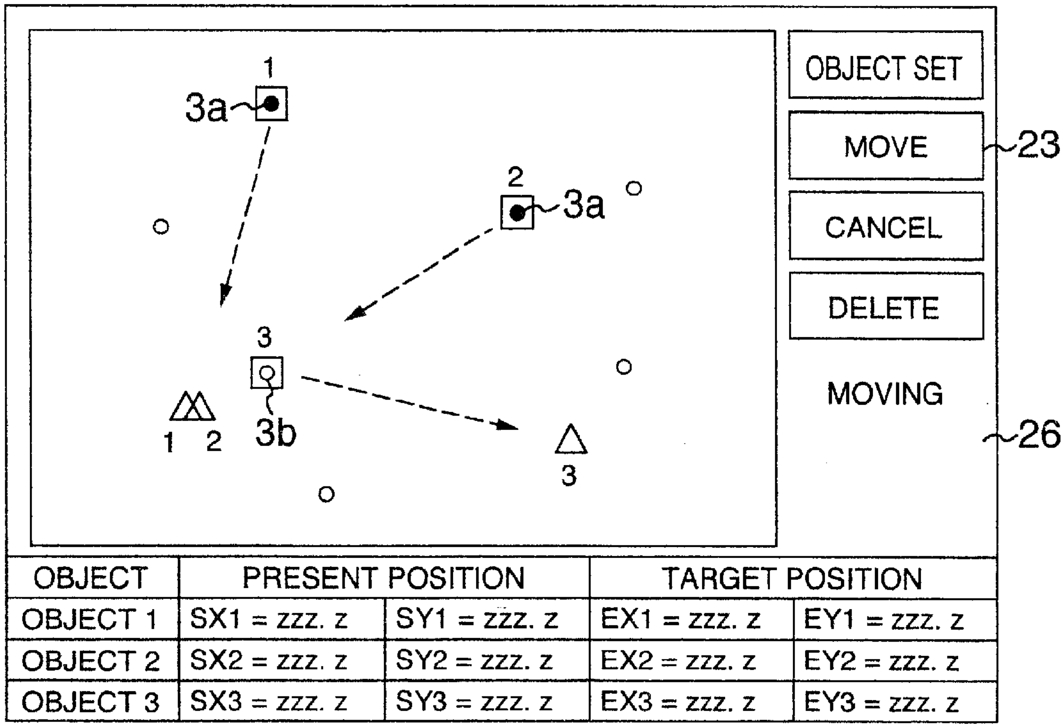
FIG. 6 is a view showing the display screen of the microorganism manipulating apparatus according to the embodiment.

As the laser projection is begun, the timer 11*a* is started (ST37), and the galvanoscanner 7 is driven again to move the radiation position to the moving end position (ST38). Thus, as shown in FIG. 6, the microorganisms 3*a* and 3*b* begin to move toward their target positions. When the time set for the timer 11*a* expires during the travel period (ST39), the laser projection is halted (ST40) and the controller 15 outputs a recognition command for the positions of the microorganisms (ST41). Thus, by identifying the image data obtained by the camera 12, the present positions of the microorganisms that have been moved are detected and the detection results are stored in the second storage unit 18.

Figure 7:
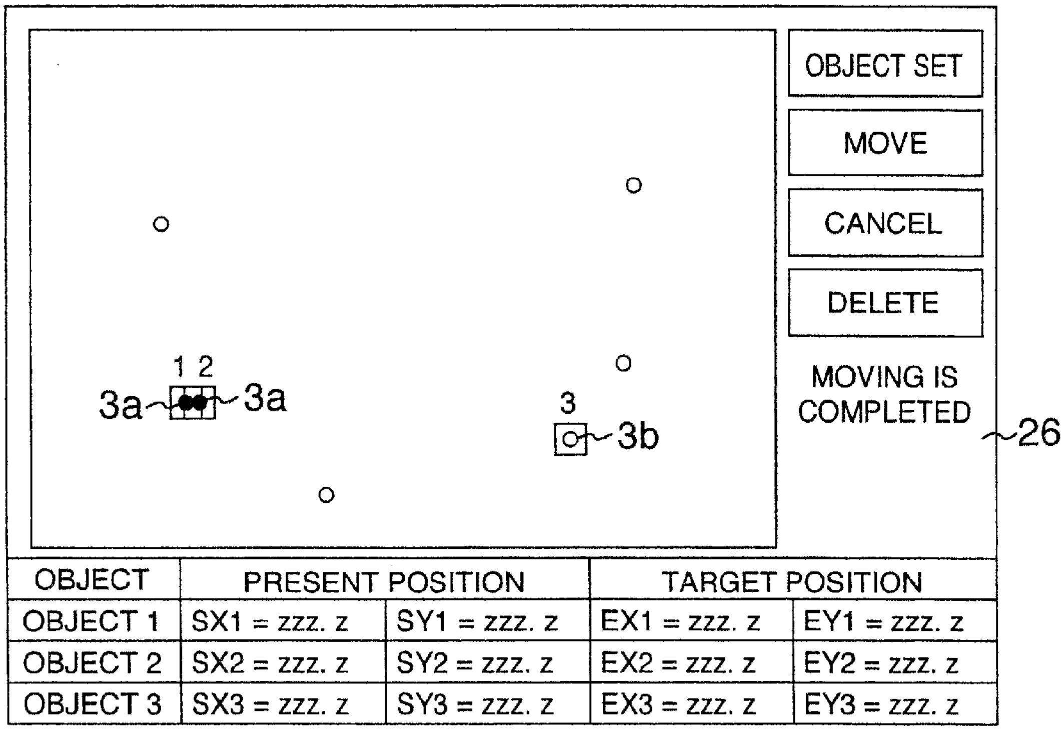
FIG. 7 is a view showing the display screen of the microorganism manipulating apparatus according to the embodiment.

Following this, a check is performed to determine whether the value of the counter C3 equals the count [object] (three) (ST42). If the count value does not equal the count [object], program control returns to ST33 and the same process is repeated for the next microorganism. And, when the count value equals the count [object], the flags F1, F2 and F3 are examined to determine whether all the designated microorganisms have reached their target positions (ST43). If not all the microorganisms have reached their target positions, program control returns to ST32 and the same process is repeated. If, however, all the microorganisms have ben reached their target positions, the moving mode is changed to the acquisition mode in the multi-trapping process (ST44). FIG. 7 shows the state where the moving of the microorganisms 3*a* and 3*b* has been completed in this manner, and displayed in the message box 26 is a message indicating the moving has been completed.

Figure 11:
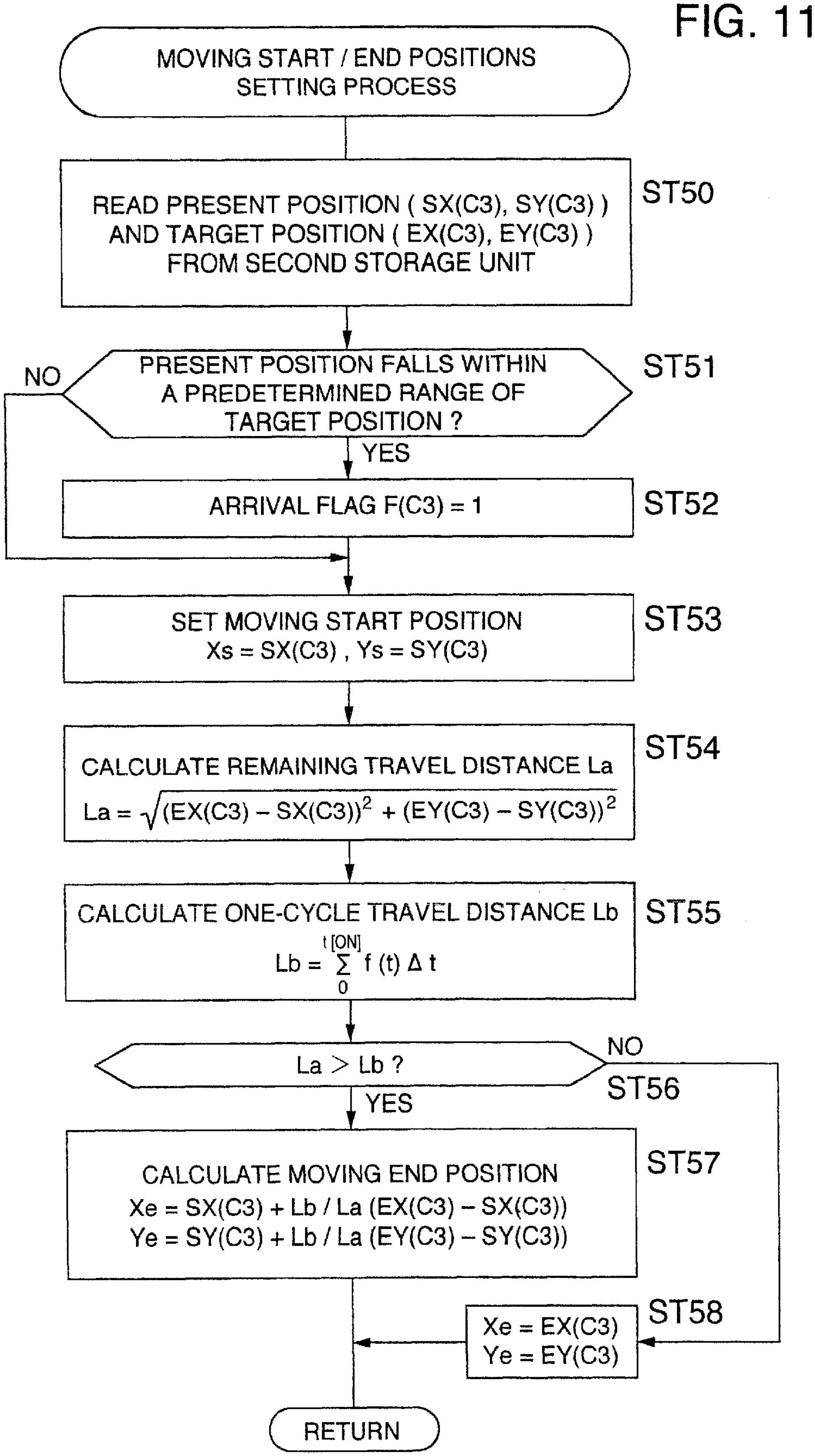
FIG. 11 is a flowchart showing the microorganism manipulating method according to the embodiment.

An explanation will now be given, while referring to FIGS. 11, 12A and 12B, for the process at ST35 in which the moving start position/moving end position is set. First, the present position (SX(C3), SY(C3)) and the target position (EX(C3), EY(C3)) for a microorganism are read from the second storage unit 18 (ST50). Then, a check is performed to determine whether the present location of the microorganism is in a range of a predetermined distance from the target position, i.e., whether the distance from the microorganism to the target location does not exceed a predetermined permissible error range (ST51). If the microorganism is situated within the permissible error range, the arrival flag F(C3) for the pertinent microorganism is set to 1 (ST52). But if the position of the microorganism is outside the permissible error range, the flag F(C3) is unchanged and the moving start position is set.

Figure 12A:
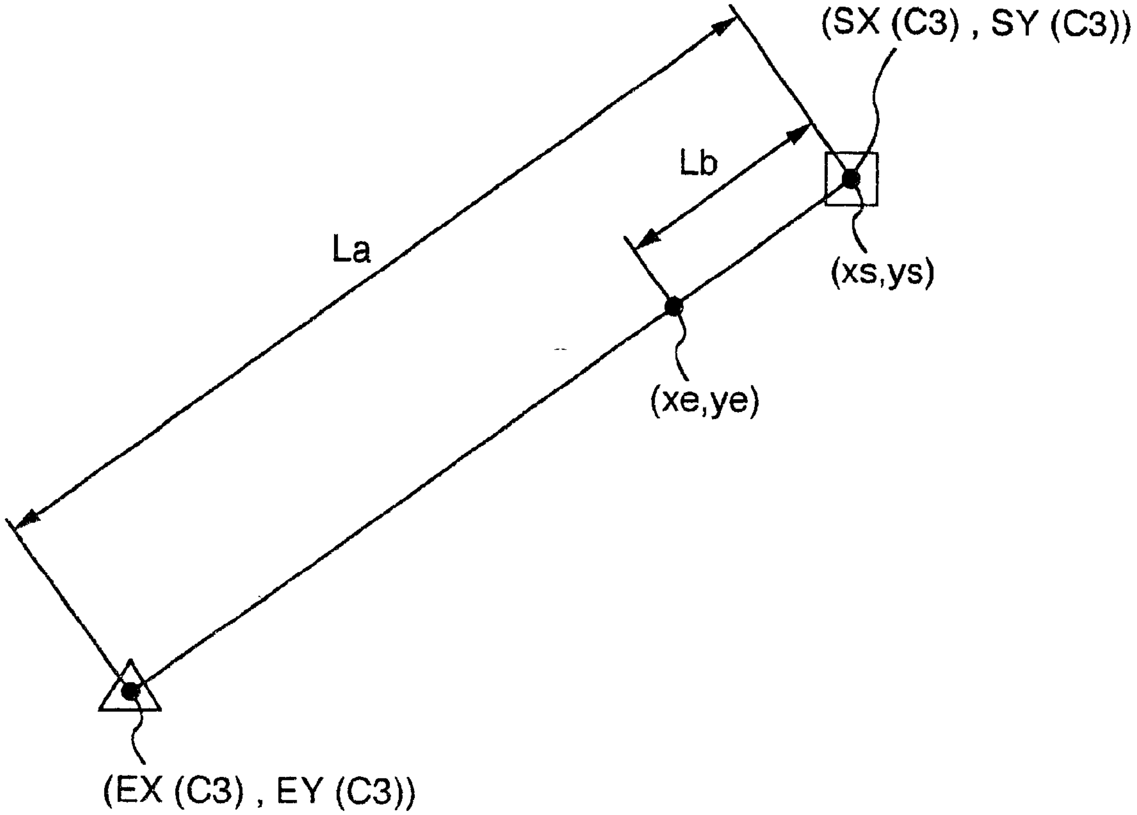
FIG. 12A is a diagram showing a moving distance of a microorganism according to the embodiment.
Figure 12B:
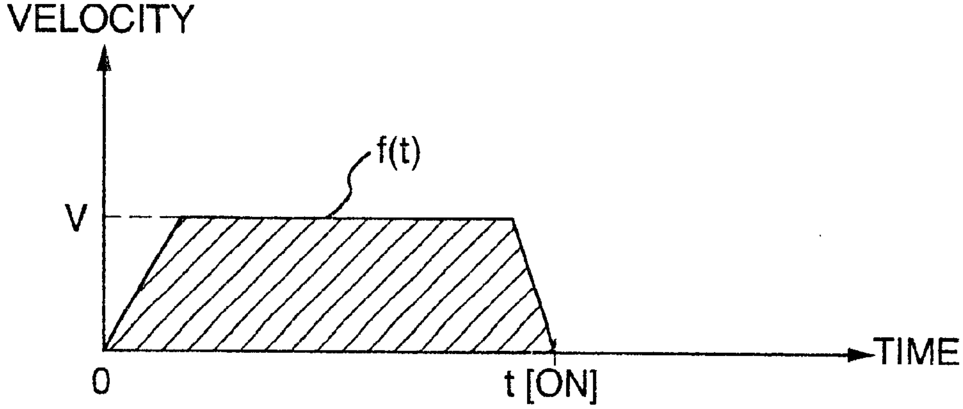
FIG. 12B is a graph showing a pattern of a moving velocity of the microorganism according to the embodiment.

Specifically, while the present position that is read is defined as a moving start position, as shown in FIG. 12A, the values xs and ys are set to SX(C3) and SY(C3) (ST53). Then, the remaining distance La between the moving start position (xs, ys) and the target position (EX(C3, EY(C3)) is calculatged under the following equation (1) by using the coordinates of the moving start position and the target position (ST54)

$$La=\sqrt{(EX(C3)-SX(C3))^2+(EY(C3)-SY(C3))^2} \quad \text{(Equation 1)}$$

Next, the one-cycle distance Lb that the pertinent microorganism travels during one scanning cycle of the laser beam is calculated under the following equation (2) (ST55). In this embodiment, the travel distance Lb is obtained by numerical integration using a velocity pattern function f(t) for the travel velocity in FIG. 12B. While in FIG. 12B a linear pattern that is simplified the most is shown as a velocity pattern function, the actual velocity pattern is set in consonance with the drive characteristic of the galvanoscanner 7.

$$Lb=\sum_{0}^{t[ON]} f(t)\Delta t \quad \text{(Equation 2)}$$

The remaining travel distance La is then compared with the one-cycle travel distance Lb (ST56), and when the remaining travel distance La is greater than the one-cycle travel distance Lb, a point which is shifted away from the moving start position (xs, ys) at only the one-cycle traveling distance Lb is defined as a moving end position (xe, ye) (ST57), and thereafter equation (3) is used to obtain the coordinate values xe and ye. That is, the coordinate values are obtained by adding to the coordinate values of the moving start position the proportional division coordinate value that is obtained by multiplying the coordinate difference to the target position by Lb/La.

$$X_e=SX(C3)+Lb/La(EX(C3)-SX(C3)),$$

$$Y_e=SY(C3)+Lb/La(EY(C3)-SY(C3)) \quad \text{(Equation 3)}$$

When the remaining travel distance La is smaller than the one-cycle travel distance Lb, i.e., when a shifted distance that is equivalent to the one-cycle travel distance La is not required until the target position has been reached, the target position (EX(C3), EY(C3)) is defined as a moving end position (xe, ye) (ST58).

As described above, according to the invention, in a microorganism manipulating apparatus in which a laser beam radiates a target microorganism and traps the microorganism optically, a single optical trap means is employed to concurrently acquire a plurality of objects in a time-sharing manner. Therefore, according to the invention, an inexpensive microorganism manipulating apparatus can be provided that possesses the merits of the optical trapping method and for which the cost of equipment for an expensive laser projection system and an expensive scanning/optical system can be minimized.

What is claimed is:

1. A method for manipulating a plurality of microorganisms so as to move said plurality of microorganisms to respective corresponding target positions, said method comprising:

(a) employing a multi-trap control means to provide control for a single laser beam scanning means in an optical trap means, said single laser beam scanning means including single laser beam radiation means for emitting a laser beam and an optical system for condensing said laser beam, said single laser beam scanning means for making said laser beam scan and for emitting the laser beam to one of said plurality of microorganisms to be manipulated in order to acquire said one of said plurality of microorganisms;

(b) storing, in a storage unit, present positions and said respective target positions for at least some of said microorganisms in a sample container so as to designate said at least some of said plurality of microorganisms as a plurality of designated microorganisms;

(c) based on the present positions stored in the storage unit, controlling said laser scanning means with said multi-trap control means to emit said laser beam to one of said designated microorganisms to trap said one of said designated microorganisms;

(d) based on the target positions stored in the storage unit, controlling said laser scanning means with said multi-trap control means to move said one of said designated microorganisms trapped in step (c) in a direction of a respective one of said target positions corresponding to said one of said designated microorganisms;

(e) detecting a position of said one of said designated microorganisms moved in step (d) and storing said detected position as a present position corresponding to said one of said designated microorganisms;

(f) sequentially performing steps (c) through (e) with respect to each of said designated microorganisms; and (g) repeating steps (c) through (f) so as to finally move said designated microorganisms to their respective corresponding target positions.

2. An apparatus for manipulating a plurality of microorganisms so as to move said plurality of microorganisms to respective corresponding target positions, said apparatus comprising:

optical trapping means including single laser beam radiation means for emitting a laser beam, an optical system for condensing said laser beam, and single laser beam scanning means for making said laser beam scan and for emitting the laser beam to one of said plurality of microorganisms to be manipulated in order to acquire said one of said plurality of microorganisms;

microorganism designation means for storing present positions and said respective corresponding target positions for at least some of a plurality of microorganisms in a sample container so as to designate said at least some of said plurality of microorganisms as a plurality of designated microorganisms; and multi-trap control means for controlling said optical trapping means so as to repeat a procedure of sequentially emitting said single laser beam to said plurality of designated microorganisms in a determined order, on a basis of said present positions stored by said microorganism designation means.

3. A microorganism manipulating apparatus as in claim 2, wherein said optical trapping means comprises a galvanoscanner and a galvanoscanner driver to condense said laser beam.

4. A microorganism manipulating apparatus as in claim 2, wherein said multi-trap control means includes a timer for defining a radiation time during which said laser beam is emitted to said plurality of designated microorganisms.

5. A microorganism manipulating apparatus as in claim 2, wherein said multi-trap control means controls said optical trap means on a basis of the respective corresponding target positions stored by said microorganism designation means so as to move said designated microorganisms, to which said laser beam is emitted, toward said respective corresponding target positions of said designated microorganisms.

6. A microorganism manipulating apparatus as in claim 2 wherein said microorganism identifying means comprises an input processor that performs analog to digital conversion of an image of microorganisms in said sample container;

an operating/input unit that enters operating commands and various data;

a display unit; and a main controller that detects positions of said microorganisms from said image, processes said operating commands and said various data, and displays said image, said operating commands and said various data on said display unit.

7. A microorganism manipulating apparatus as in claim 6, wherein said multi-trap control means performs a multi-trapping process separately from said main controller.

8. A microorganism manipulating apparatus as in claim 6, wherein said main controller detects positions of said plurality of designated microorganisms in each period of emission of said laser beam.

* * * * *